United States Patent

Morita

[11] Patent Number: 5,928,335
[45] Date of Patent: Jul. 27, 1999

[54] CLIENT/SERVER SYSTEM HAVING MIDDLEWARE-BASED INTERFACE BETWEEN CLIENT AND SERVER IMAGE PROCESSING OBJECTS

[75] Inventor: Tetsuya Morita, Kanagawa, Japan

[73] Assignee: Ricoh Company, Ltd., Tokyo, Japan

[21] Appl. No.: 08/959,848

[22] Filed: Oct. 29, 1997

[30] Foreign Application Priority Data

Oct. 30, 1996 [JP] Japan .................................. 8-287920

[51] Int. Cl.$^6$ .................................................. G06F 13/00
[52] U.S. Cl. .......................................................... 709/303
[58] Field of Search ....................... 364/DIG. 1 MS File, 364/DIG. 2 MS File; 395/701, 705, 707; 709/200, 201, 202, 203, 226, 236, 300, 303

[56] References Cited

U.S. PATENT DOCUMENTS 5,634,127  5/1997  Cloud et al. ............................ 395/680
5,748,188  5/1998  Hu et al. ................................. 345/326

FOREIGN PATENT DOCUMENTS 7-78057  3/1995  Japan .

Primary Examiner—Robert B. Harrell
Attorney, Agent, or Firm—Oblon, Spivak, McClelland, Maier & Neustadt, P.C.

[57] ABSTRACT

A client/server system includes a client and a plurality of servers which are connected via a communication network. The client includes an object-oriented middleware and client-form image processing objects. A middleware processing device converts a client-form request from a request input device into a standard-form request readable by the middleware. A request transmitting device transmits the standard-form request to the network. Each of the servers includes an object-oriented middleware, image processing units, and image processing objects. The image processing objects of each server have specific interfaces to the image processing units, any one of the image processing objects allowing a corresponding one of the image processing units to be executed in response to a server-form request. A middleware processing device of the server converts the standard-form request from the network into a server-form request, and transmits the server-form request to a selected one of the image processing objects so that a corresponding one of the image processing units is executed in response to the server-form request.

14 Claims, 10 Drawing Sheets

CLIENT/SERVER SYSTEM HAVING MIDDLEWARE-BASED INTERFACE BETWEEN CLIENT AND SERVER IMAGE PROCESSING OBJECTS

BACKGROUND OF THE INVENTION (1) Field of the Invention

The present invention relates to a client/server system in which an object within a client at a remote or local location makes a request to and receives a response from one of a plurality of image processing objects within one of a plurality of servers by utilizing an object-oriented middleware contained in the client and the servers. Further, the present invention relates to a computer program product embedded in a computer readable storage medium to either execute the functions of the client or execute the functions of the image processing objects which the servers provide for the client.

(2) Description of the Related Art

A client/server system developed to improve efficiency of a network of data processing devices is known. Typically, in this client/server system, one or more client computers, such as personal computers or workstations, and one or more server computers, such as file servers or database servers, are connected to a communication network such as a local area network (LAN).

Hereinafter, in the following description, the client computers will be simply called clients, and the server computers will be simply called servers, for the sake of simplicity.

In a case in which the servers in the above client/server system are file servers including stored document data, a request for retrieving data of a desired document is input by a user on one of the clients on the network, and this request is transmitted to one of the file servers via the communication network. The file server produces a result of the retrieval of document data as a response to the request, and the response is transmitted to the client via the communication network.

Generally, the client and server computers in the above-mentioned system use different operating systems and different formats of data being processed. It is necessary that application programs are individually developed for the respective computers in conformity with their operating systems and their data conversion formats. Therefore, the development of application programs for the above client/server system has been very costly.

Recently, the Common Object Request Broker Architecture (CORBA) has been proposed by the Object Management Group (OMG) for a next generation of middleware. The CORBA provides an Object Request Broker (ORB) which defines a CORBA object bus. The ORB is middleware that has the potential of subsuming every other form of existing client/server middleware. The CORBA uses objects as a unifying metaphor for bringing to the bus existing applications.

The CORBA ORB lets objects transparently make requests to and receive responses from other objects located locally or remotely. The client is not aware of the mechanisms used to communicate with, activate, or store the server objects. The ORB provides various benefits which cannot be attained by other forms of middleware. For example, a CORBA ORB lets a user either statically define the user's method invocations at compile time, or it lets a user dynamically discover the method invocations at run time. Further, a CORBA ORB lets a user invoke methods on server objects using the user's high-level language of choice—currently C, C++, Ada and Smalltalk. It does not matter what language server objects are written in. The CORBA separates interface from implementation and provides language-neutral data types that make it possible to call objects across language and operating system boundaries. In contrast, other types of middleware typically provide low-level, language-specific, application interface libraries. And they do not separate implementation from specification—the application interface is tightly bound to the implementation, which makes it very sensitive to changes.

Further, the OMG has provided interface specifications which are written in a neutral Interface Definition Language (IDL). The IDL defines a component's boundaries, that is, its contractual interfaces with potential clients. Components written in the IDL are portable across programming languages, tools, operating systems, and networks.

It is conceivable to utilize the CORBA ORB as a middleware for a client-server system. The ORB-based client/server system makes it possible to exchange character or numerical data between the client and the server using different operating systems.

However, there is no known ORB-based client/server system which is applied to image processing services including enabling a remote client to transparently make a request to and receive a response from one of a plurality of image processing objects within a server across a network. The services of the image processing objects which are provided by such a system to the client may include an image printing service, an image reading service, a facsimile service, an image data communication service and a malfunction monitoring service. Many servers in the known client/server systems cannot provide the client with such image processing services.

It is desirable to provide a client/server system that can provide the client with image processing services from the server in response to a request sent by the client across a network. This client/server system provides various image processing services for the client, for example, a parallel printing function of multiple image processing devices, or a remote-controlled replacement of an existing server by a new server when the existing server malfunctions. Although there is an increasing need for the provision of such image processing services, it is impossible for the existing client/server systems to provide the image processing services.

SUMMARY OF THE INVENTION

An object of the present invention is to provide a client/server system which enables an object within a remote client to transparently make a request to and receive a response from one of a plurality of image processing objects within one of a plurality of servers by utilizing an object-oriented middleware contained in the client and the servers.

Another object of the present invention is to provide a computer program product embodied in a computer readable storage medium in the client and the servers to execute the functions of the client in the client/server system.

A still another object of the present invention is to provide a computer program product embodied in a computer readable storage medium in each of the servers to execute the functions of the image processing objects which the servers provide for the client in the client/server system.

The above-mentioned objects of the present invention are achieved by a client/server system which comprises a client and a plurality of servers connected via a communication network, the client including: an object-oriented middleware; an object storage device which has a plurality of client-form image processing objects; a request input device which receives a client-form request input by a user at the client, the client-form request indicating a selected one of the image processing objects of the object storage device; a middleware processing device which converts the client-form request from the request input device into a standard-form request readable by the middleware; and a request transmitting device which transmits the standard-form request from the middleware processing device to the communication network, and each of the plurality of servers including: an object-oriented middleware; a plurality of image processing units; an object storage device which has a plurality of image processing objects, the image processing objects having specific interfaces to the image processing units, any one of the image processing objects allowing a corresponding one of the image processing units to be executed in response to a server-form request; a request receiving device which receives a standard-form request from the communication network, the standard-form request indicating a selected one of the image processing objects in the object storage device of the server; a middleware processing device which converts the standard-form request from the request receiving device into a server-form request, and transmits the server-form request to the selected one of the image processing objects so that a corresponding one of the image processing units is executed in response to the server-form request.

The above-mentioned objects of the present invention are achieved by a computer program product for use with a client in a client/server system wherein the client comprises a plurality of image processing objects and an object-oriented middleware, the computer program product comprising: a computer readable storage medium and a program code mechanism embedded in the computer readable storage medium, the program code mechanism comprising: a first program code means which causes the client to receive a client-form request, the client-form request indicating a selected one of the image processing objects of the client; a second program code means which causes the client to convert the client-form request from the first program code means into a standard-form request readable by the middleware; and a third program code means which causes the client to transmit the standard-form request from the second program code means to a communication network.

The above-mentioned objects of the present invention are achieved by a computer program product for use with a server in a client/server system wherein the server comprises a plurality of image processing objects, an object-oriented middleware and a plurality of image processing units, the image processing objects having specific interfaces to the image processing units, any one of the image processing objects allowing a corresponding one of the image processing units to be executed in response to a server-form request, the computer program product comprising: a computer readable storage medium and a program code mechanism embedded in the computer readable storage medium, the program code mechanism comprising: a first program code means which causes the server to receive a standard-form request from a communication network, the standard-form request indicating a selected one of the image processing objects of the server; a second program code means which causes the server to convert the standard-form request from the first program code means into a server-form request; and a third program code means which causes the server to transmit the server-form request from the second program code means to the selected one of the image processing objects so that a corresponding one of the image processing units is executed in response to the server-form request.

In the client/server system of the present invention, one of the image processing units in each of the plurality of servers, such as digital copiers or facsimile machines, can be utilized by the remote client across the communication network. According to the client/server system of the present invention, the image processing objects for the client and the servers can be prepared using the Interface Definition Language (IDL) regardless of which programming language or which operating system the client/server computers use, and it is not necessary that the application programs of the client and the servers be individually developed for the respective computers in conformity with their operating systems and their data conversion formats. Therefore, the present invention makes it possible to increase the efficiency of development of the application programs of the client/server system and ensure the implementation thereof at a reduced cost.

BRIEF DESCRIPTION OF THE DRAWINGS

The above and other objects, features and advantages of the present invention will be more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
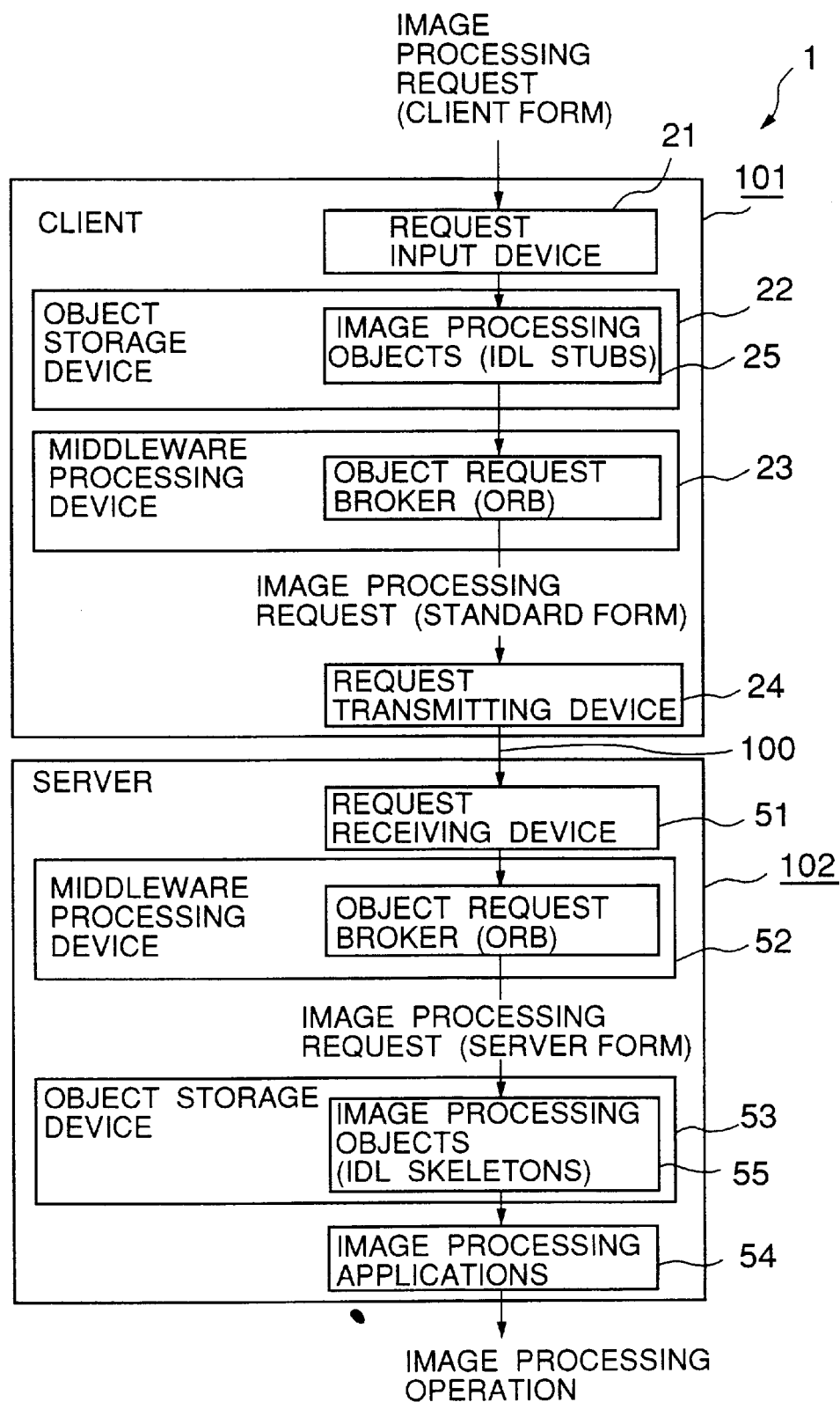
FIG. 1 is a diagram showing a configuration of a client and a server in one embodiment of a client/server system of the present invention.
Figure 2:
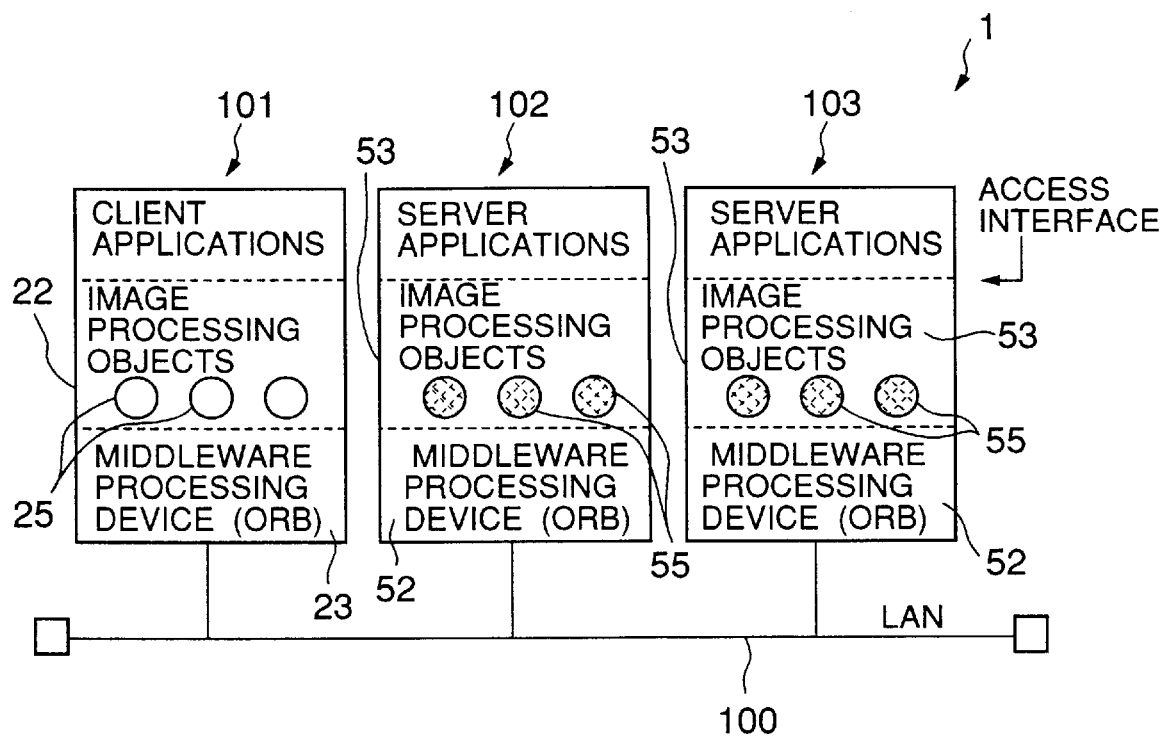
FIG. 2 is a diagram showing a configuration of the embodiment of the client/server system.

FIG. 1 shows a configuration of a client 101 and a server 102 in one embodiment of a client/server system 1 of the present invention. FIG. 2 shows a configuration of the present embodiment of the client/server system 1.

As shown in FIG. 2, a client 101 and a plurality of servers 102, 103, . . . in the client/server system 1 are connected via a communication network 100. A local area network (LAN), such as a token-ring network or an Ethernet network, is constructed with the communication network 100 and the client/server system 1. In the present embodiment, the client 101 is a computer system, such as a workstation or a personal computer, and the servers 102, 103, . . . are an image processing system, devices, such as a digital copier or a facsimile machine.

Figure 3:
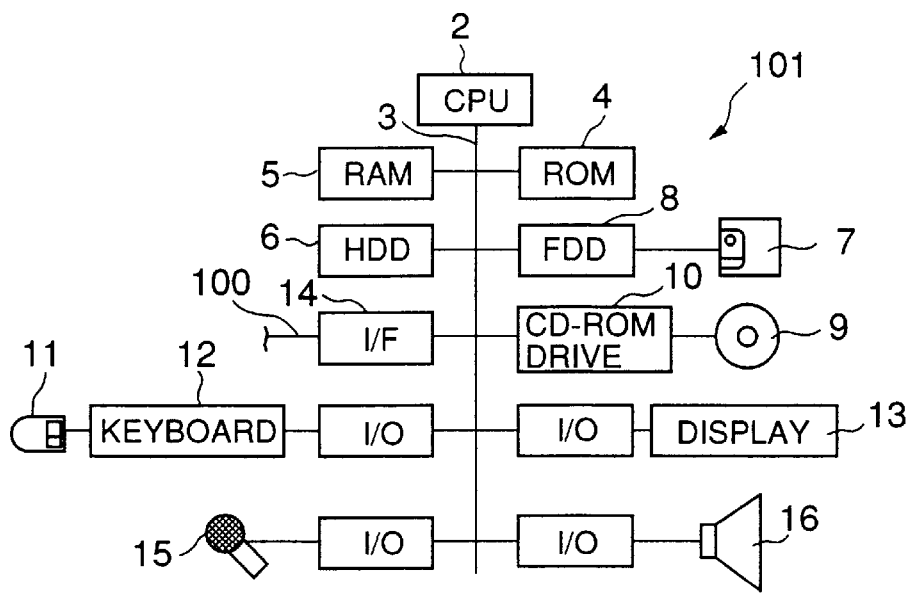
FIG. 3 is a block diagram of an example of the client in the client/server system.
Figure 4:
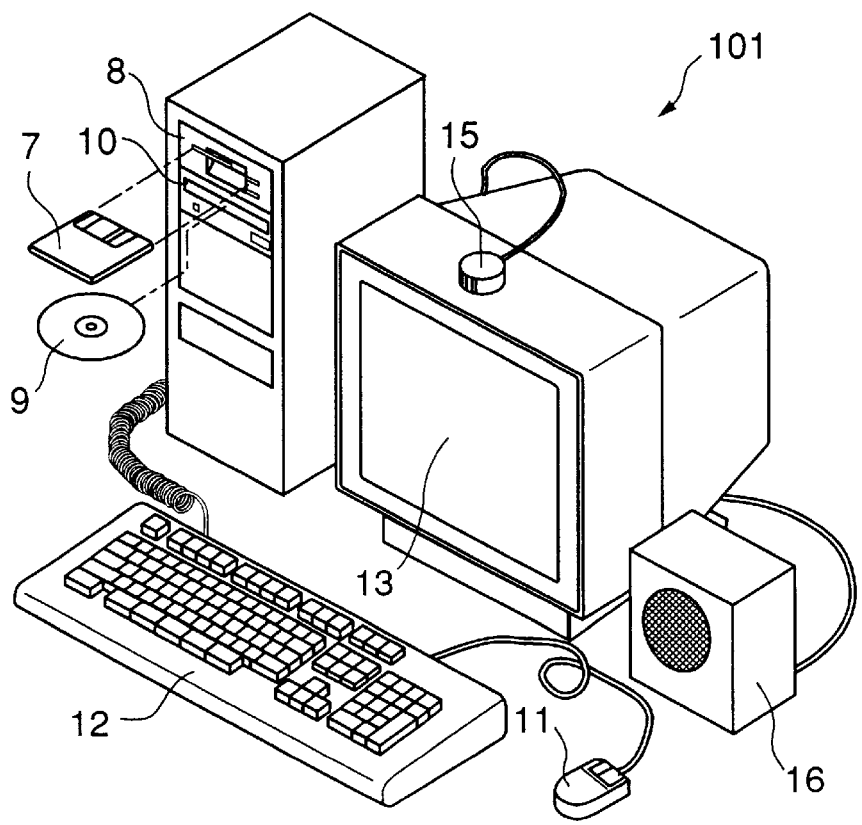
FIG. 4 is a perspective view showing a physical structure of the client of FIG. 3.

FIG. 3 shows an example of the client in the present embodiment of the client/server system 1. FIG. 4 shows a physical structure of the client of FIG. 3.

As shown in FIG. 3 and FIG. 4, the client 101 includes a central processing unit (CPU) 2. Various elements of the client 101 are connected to the CPU 2 by an internal bus 3. The elements include a read only memory (ROM) 4, a random access memory (RAM) 5, a hard disk drive (HDD) 6, a floppy disk drive (FDD) 8, a compact-disk read-only-memory (CD-ROM) drive 10, and a communication interface (I/F) 14. Further, a keyboard 12, a display 13, a microphone 15 and a speaker 16 are connected to the bus 3 through respective input/output interfaces (I/O). A floppy disk 7 is inserted in the FDD 8. A CD-ROM 9 is inserted in the CD-ROM drive 10. A mouse 11 is attached to the keyboard 12 and connected to the CPU 2 via the keyboard 12. The I/F 14 is connected to the communication network 100.

In the present embodiment of the client 101, program code instructions are stored in the CD-ROM 9 which are read by the CD-ROM drive 10. The program code instructions are transferred to the RAM 5 and then executed by the CPU 2 to carry out various data processing operations. Further, the program code instructions from the CD-ROM 9 may be loaded to the HDD 6. During a start-up of the client 101, the program code instructions from the HDD 6 are transferred to the RAM 5 and then executed by the CPU 2. Alternatively, the program code instructions may be loaded to the ROM 4.

In the present embodiment, the CD-ROM 9, the HDD 6, the RAM 5 or the ROM 4 corresponds to the computer readable storage medium in the claims. However, the computer readable storage medium includes any storage device, such as for example, magnetic disks (floppy disks), optical disks including DVDs, magneto-optical disks such as MOs, semiconductor memory cards such as PC cards, and other types of computer-readable storage devices and media.

In the present embodiment of the client 101, the CPU 2 executes the program code instructions in the RAM 5 and carries out a desired data processing operation of the computer system. Further, the execution of the program code instructions by the CPU 2 makes the client 101 function as the client in the client/server system 1.

As shown in FIG. 1, the client 101 comprises a request input device 21, an object storage device 22, a middleware processing device 23, and a request transmitting device 24. These devices are provided by the execution of the program code instructions by the CPU 2.

The object storage device 22 is formed by a portion of the RAM 5. A plurality of client-form image processing objects 25 are loaded to the object storage device 22 by the CPU 2. The client-form image processing objects 25 in the present embodiment may include client IDL stubs which will be described later.

By the execution of the program code instructions by the CPU, the request input device 21 receives a client-form request which is manually input by using the keyboard 12 or other input devices. The client-form request indicates a selected one of the image processing objects 25 of the object storage device 22. More specifically, a user at the client 101 manually inputs a given command from the keyboard 12, and then the CPU 2 reads out the image processing objects 25 from the object storage device 22 and causes the display 13 to show the image processing objects 25. When the image processing objects 25 are shown on the display 13, the user designates a selected one of the image processing objects 25 by using the keyboard 12 or the mouse 11. The designated image processing object 25 is accepted by the request input device 21 as the client-form request.

The middleware processing device 23 includes an object-oriented middleware. The object-oriented middleware in the present embodiment is an Object Request Broker (ORB) provided by the CORBA mentioned above, and the ORB is stored in the RAM 5. By the execution of the program code instructions by the CPU 2, the middleware processing device 23 converts the client-form request from the request input device 21 into a standard-form request which is readable by the ORB.

By the execution of the program code instructions by the CPU 2, the request transmitting device 24 transmits the standard-form request from the middleware processing device 23 to the communication network 100 via the communication I/F 14.

By utilizing the ORB, the selected one of the client-form image processing objects 25 within the client 101 can transparently make a request to and receive a response from a corresponding one of image processing objects within one of the servers 102, 103, . . . across the communication network 100. The ORB intercepts the request and is responsible for finding an image processing object that can implement the request, pass the parameters to it, invoke its method, and return the results. The client does not have to be aware of where the image processing object is located, its programming language, its operating system or others. In the present embodiment, the ORB of the client 101 allows the standard-form request to be transmitted to one (for example, the server 102) of the servers 102, 103, . . . via the communication network 100.

As described above, the program code instructions in the RAM 5 includes a program code means for causing the CPU 2 to read out the image processing objects 25 from the RAM 5 and to display the image processing objects 25 on the display 13.

Figure 5:
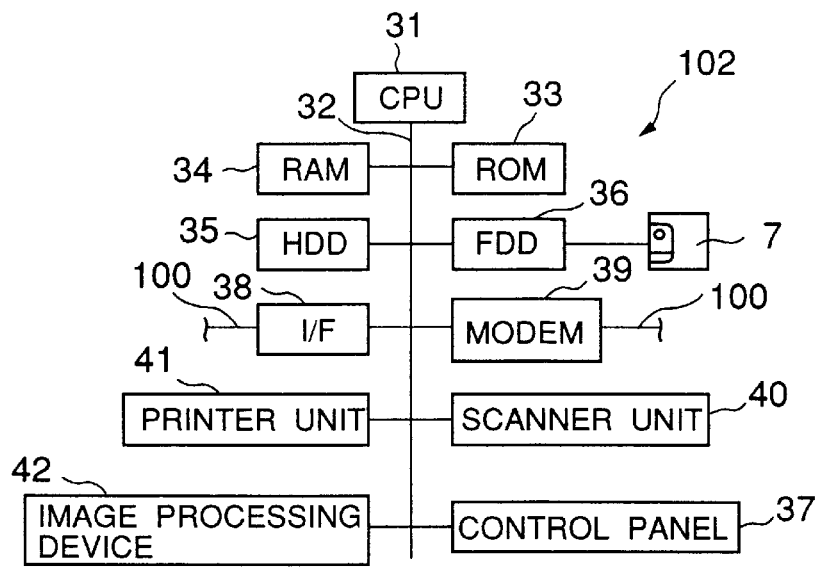
FIG. 5 is a block diagram of an example of the server in the client/server system.
Figure 6:
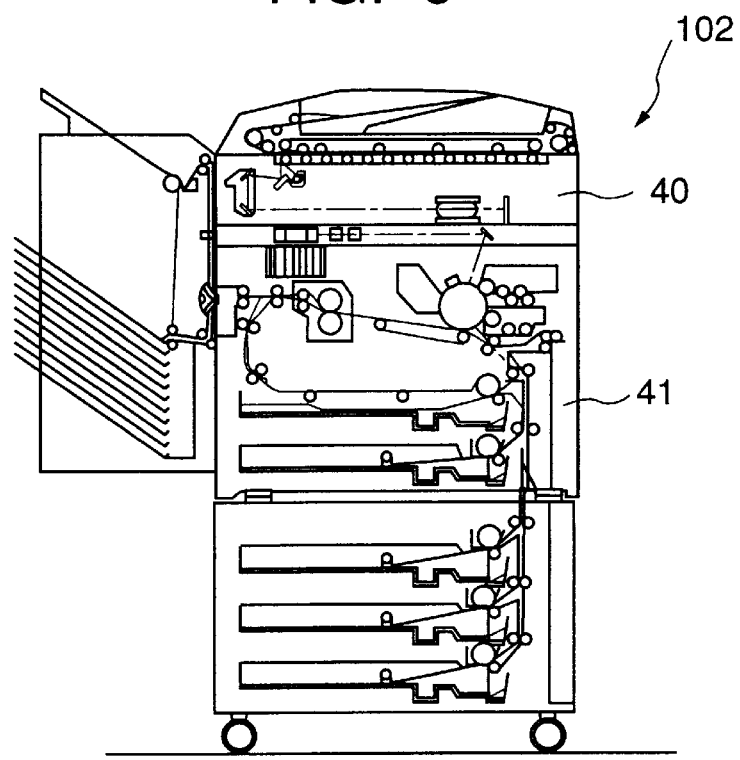
FIG. 6 is a cross-sectional view showing a physical structure of the server of FIG. 5.
Figure 7:
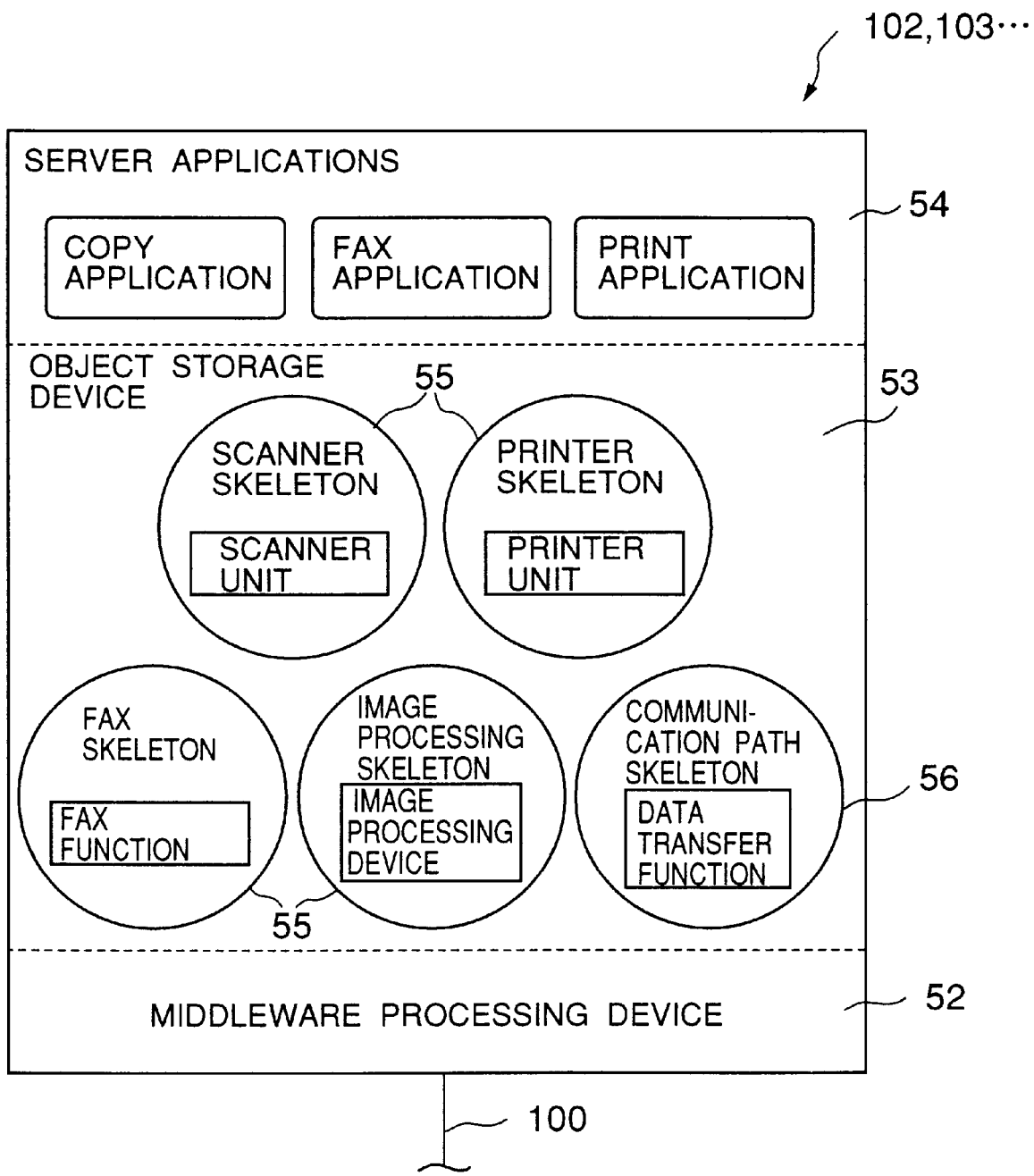
FIG. 7 is a diagram for explaining a configuration of one of the servers in the client/server system.

Next, FIG. 5 shows an example of the server 102 in the client/server system 1. FIG. 6 shows a physical structure of the server 102 of FIG. 5. FIG. 7 shows a configuration of one of the servers 102, 103, . . . in the client/server system 1. In the following, a description of only the server 102 will be given. The other servers 103, . . . are computer systems similar to the server 102, and a duplicate description will be omitted.

The server 102 as shown in FIG. 6 is a multi-function digital copier. The server 102 includes a central processing unit (CPU) 31. Various elements are connected to the CPU 31 by an internal bus 32 within the server 102. The elements connected to the CPU 31 include a read only memory (ROM) 33, a random access memory (RAM) 34, a hard disk drive (HDD) 35, a floppy disk drive (FDD) 36, a communication interface (I/F) 38, and a modem unit 39. Further, a control panel 37, a scanner unit 40, a printer unit 41, and an image processing device 42 are connected to the CPU 31 by the bus 32. A floppy disk 7 is inserted in the FDD 36. Both the I/F 38 and the modem unit 39 are connected to the communication network 100. The communication network 100 is further connected to a public telephone line (not shown).

In the present embodiment of the digital copier, the modem unit 39, the scanner unit 40, the printer unit 41, and the image processing device 42 are collectively called image processing units of the server 102. These elements are the hardware of the server 102 which carries out the image processing functions as the digital copier.

In the present embodiment of the digital copier, program code instructions for the server 102 may be stored in the floppy disk 7, and the program code instructions are read by the CPU 31 through the FDD 36. The program code instructions are transferred to the RAM 34 and then executed by the CPU 31 to carry out various image processing operations. Further, the program code instructions from the floppy disk 7 may be loaded to the HDD 35. During a start-up of the server 102, the program code instructions from the HDD 35 are read by the CPU 31 and transferred to the RAM 34 and then executed by the CPU 31. Alternatively, the program code instructions may be loaded to the ROM 33.

In the present embodiment, the floppy disk 7, the HDD 35, the RAM 34 or the ROM 33 corresponds to the computer readable storage medium in the claims. However, the computer readable storage medium includes any storage device, such as for example, magnetic disks (floppy disks), optical disks including DVDs, magneto-optical disks such as MOs, semiconductor memory cards such as PC cards, and other types of computer-readable storage devices and media.

In the present embodiment of the digital copier, the CPU 31 executes the program code instructions in the RAM 34, and carries out a desired image processing operation of the digital copier. Further, the execution of the program code instructions by the CPU 31 causes the digital copier to function as the server 102 in the client/server system 1.

As shown in FIG. 1, the server 102 includes a request receiving device 51, a middleware processing device 52, an object storage device 53, and image processing applications 54. These devices are the software of the server 102 stored in the RAM 34, and the functions of these devices are provided by the execution of the program code instructions by the CPU 31. The server 102 further includes a data output device (not shown) and a data input device (not shown) which will be described later.

The object storage device 53 is formed by a portion of the RAM 34. A plurality of server-form image processing objects 55 are loaded to the object storage device 53 by the CPU 31. The server-form image processing objects 55 in the object storage device 53, as shown in FIG. 7, correspond to the image processing applications 54 and have specific interfaces to the image processing units 39–42 of the server 102. The server-form image processing objects 55 in the present embodiment include server IDL skeletons and their parameters. The server IDL skeletons include common interfaces for image processing units in the plurality of servers 102, 103, . . . when the image processing units provide a substantially same service and have different specifications.

In the server 102, one of the image processing applications 54 is executed by the CPU 31 to operate a corresponding one of the image processing units 39–42 of the server 102 in response to either a specific user request or a standard-form image processing request. Specifically, when a user at the server 102 manually inputs a given command by depressing a related key of the control panel 37, the CPU 31 executes one of the image processing applications 54 so that a corresponding one of the image processing units 39–42 of the server 102 is operated.

In the present embodiment of the server 102, the data output device transmits image data, output by one of the image processing units 39–42, to the communication network 100 via the I/F 38 or the modem unit 39. The data input device receives image data from the communication network 100 via the I/F 38 or the modem unit 39, the image data being sent from another server in the client/server system 1 to the server 102. The data input device sends the received image data to the printer unit 41 or the image processing device 42 provided within the server 102.

The image processing applications 54 of the server 102 as shown in FIG. 7 include: a copy application for causing the scanner unit 40 to optically read out image data from a document and causing the printer unit 41 to print the image data on a copy sheet; a print application for causing the printer unit 41 to print image data on a copy sheet; an image processing application for causing the image processing device 42 to process image data by a certain image processing method (for example, image data compression or decompression); and a fax application for causing the modem unit 39 to transmit image data to the communication network 100. These image processing applications 54 are stored in the RAM 34.

Further, by the execution of the program code instructions by the CPU 32, a standard-form request from the communication network 100 is received by the request receiving device 51. At this time, one of the image processing applications 54 is executed by the CPU 31 to operate a selected one of the image processing units 39–42 of the server 102 in response to the standard-form request as follows.

The standard-form request in the present embodiment is a form of request which can be properly transmitted or received between the object-oriented middleware (the ORB) of the client 101 and the servers 102, 103, . . . in the client/server system 1. The standard-form request indicates a selected one of the image processing objects 55 in the object storage device 53 of the server 102. The standard-form request transmitted by the request transmitting device 24 of the client 101 is properly received by the request receiving device 51 of the server 102. The image processing object, selected on the client side, corresponds to the selected one of the image processing objects 55 on the server side.

The object storage device 53, as shown in FIG. 7, further includes a communication path object 56 (which is indicated as a communication path skeleton 56 in FIG. 7) in addition to the image processing objects 55. The execution of the program code instructions in the RAM 34 by the CPU 31 may cause an image processing request to be input to the communication path object 56. The execution of the program code instructions in the RAM 34 by the CPU 31 may cause the data output device of the server 102 to transmit image data to the communication network 100 in response to the image processing request by using a method unrelated to the object-oriented middleware (the ORB). Further, the execution of the program code instructions in the RAM 34 by the CPU 31 may cause the data input device of the server 102 to receive image data from the communication network 100 in response to the image processing request by using a method unrelated to the object-oriented middleware (the ORB). The method unrelated to the object-oriented middleware is, for example, a method of transmitting bit-map image data to or receiving bit-map image data from the communication network 100.

The middleware processing device 52 includes an object-oriented middleware. The object-oriented middleware in the present embodiment is the Object Request Broker (ORB) provided by the CORBA mentioned above, and the ORB is stored in the RAM 34. By the execution of the program code instructions by the CPU 31, the middleware processing device 52 converts the standard-form request from the request receiving device 51 into a server-form request, and transmits the server-form request to the selected one of the image processing objects 55 in the object storage device 53 so that a corresponding one of the image processing units 39–42 is executed in response to the server-form request.

By the execution of the program code instructions by the CPU 31, when the server-form request is input to the object storage device 53, the CPU 31 causes the corresponding one of the image processing units 39–42 to be operated in accordance with the selected image processing application 54.

Further, in the above-described client/server system 1, the client 101 receives a response from one of the image processing objects 55 in the object storage device 53 of the server 102 by means of the ORB in a manner reverse to the above-described manner.

As described above, the request receiving device 51, the middleware processing device 52 (including the ORB), the object storage device 53 (including the image processing objects 55 and the communication path object 56) and the image processing applications 54 are the software of the server 102 which is stored in the RAM 34, and the functions of these devices are provided by the execution of the program code instructions in the RAM 34 by the CPU 31.

More specifically, the program code instructions within the server 102 include: a portion which causes the scanner unit 40 to optically read out image data from a document when it is executed by the CPU 31; a portion which causes the printer unit 41 to print image data on a copy sheet when it is executed by the CPU 31; a portion which causes the image processing device 42 to process image data when it is executed by the CPU 31; and a portion which causes the modem unit 39 to transmit image data to the communication network 100 when it is executed by the CPU 31.

Further, the program code instructions within the server 102 include: a portion which causes the server 102 to receive a standard-form request from the communication network 100 via the I/F 38 when it is executed by the CPU 31; a portion which causes the server 102 to convert the standard-form request into a server-form request and transmit the server-form request to a selected one of the image processing objects 55; and a portion which causes the server 102 to execute a corresponding one of the image processing applications 54 in response to the server-form request when it is executed by the CPU 31.

Further, the program code instructions within the server 102 include: a portion which causes an image processing request to be input to the communication path object 56 when it is executed by the CPU 31; a portion which causes the server 102 to transmit image data to the communication network 100 in response to the image processing request by using a method unrelated to the ORB of the middleware processing device 52 when it is executed by the CPU 31; and a portion which causes the server 102 to receive image data from the communication network 100 in response to the image processing request by using a method unrelated to the ORB of the middleware processing device 52 when it is executed by the CPU 31.

As in the above-described embodiment, the plurality of servers 102, 103, . . . in the client/server system 1 include the image processing objects 55 having specific interfaces to the image processing units 39–42 of the server, any one of the image processing objects 55 allowing a corresponding one of the image processing units 39–42 to be executed in response to the server-form request. The client 101 in the client/server system 1 includes the image processing objects 25 which respectively correspond to all the image processing objects 55 included in the plurality of servers 102, 103, . . . in the client/server system 1.

As in the above-described embodiment, the image processing objects 55 of the plurality of servers 102, 103, . . . include common access interfaces for image processing units in the servers when such image processing units provide a substantially identical service and have different specifications. For example, in a case in which both the server 102 and the server 103 include a printer unit, the printer units of these servers provide a substantially identical service but the specifications of the printer units may be different from each other. In such a case, the image processing objects 55 of these servers include common access interfaces for the printer units.

Next, a description will be given of an image processing method provided by the above-described embodiment of the client/server system 1.

As in the above-described embodiment, the object-oriented middleware (the ORB) is provided for the client 101, and the client-form image processing objects 25 are provided for the client 101. A client-form request which is input by a user at the client 101 is received by the client 101, the client-form request indicating a selected one of the image processing objects 25. The client-form request is converted into a standard-form request which is readable by the middleware. The standard-form request is transmitted to the communication network 100 by the client 101.

As in the above-described embodiment, the object-oriented middleware (the ORB) is provided for each of the plurality of servers 102, 103, . . . , the image processing units 39–42 are provided for each of the plurality of servers 102, 103, . . . , and the image processing objects 55 are provided for each of the plurality of servers 102, 103, . . . The image processing objects 55 have specific interfaces to the image processing units 39–42, and any one of the image processing objects 55 allows a corresponding one of the image processing units 39–42 to be executed in response to a server-form request.

The standard-form request from the communication network 100 is received by one of the servers, the standard-form request indicating a selected one of the image processing objects 55 in one of the servers. The standard-form request is converted into a server-form request and transmitted to the selected one of the image processing objects 55 so that a corresponding one of the image processing units 39–42 is executed in response to the server-form request.

Further, in the above-described client/server system 1, the client 101 receives a response from the selected one of the image processing objects 55 in one of the servers by means of the ORB in a manner reverse to the above-described manner.

Accordingly, in the above-described client/server system 1, it is possible for the remote client 101 to utilize one of the image processing units 39–42 in each of the plurality of servers 102, 103, . . . across the communication network 100.

Next, a description will be given of another image processing method provided by the above-described embodiment of the client/server system 1. In the above-described client/server system 1, it is possible to transmit image data between the image processing objects from one of the plurality of servers to another server in the client/server system 1.

Figure 8:
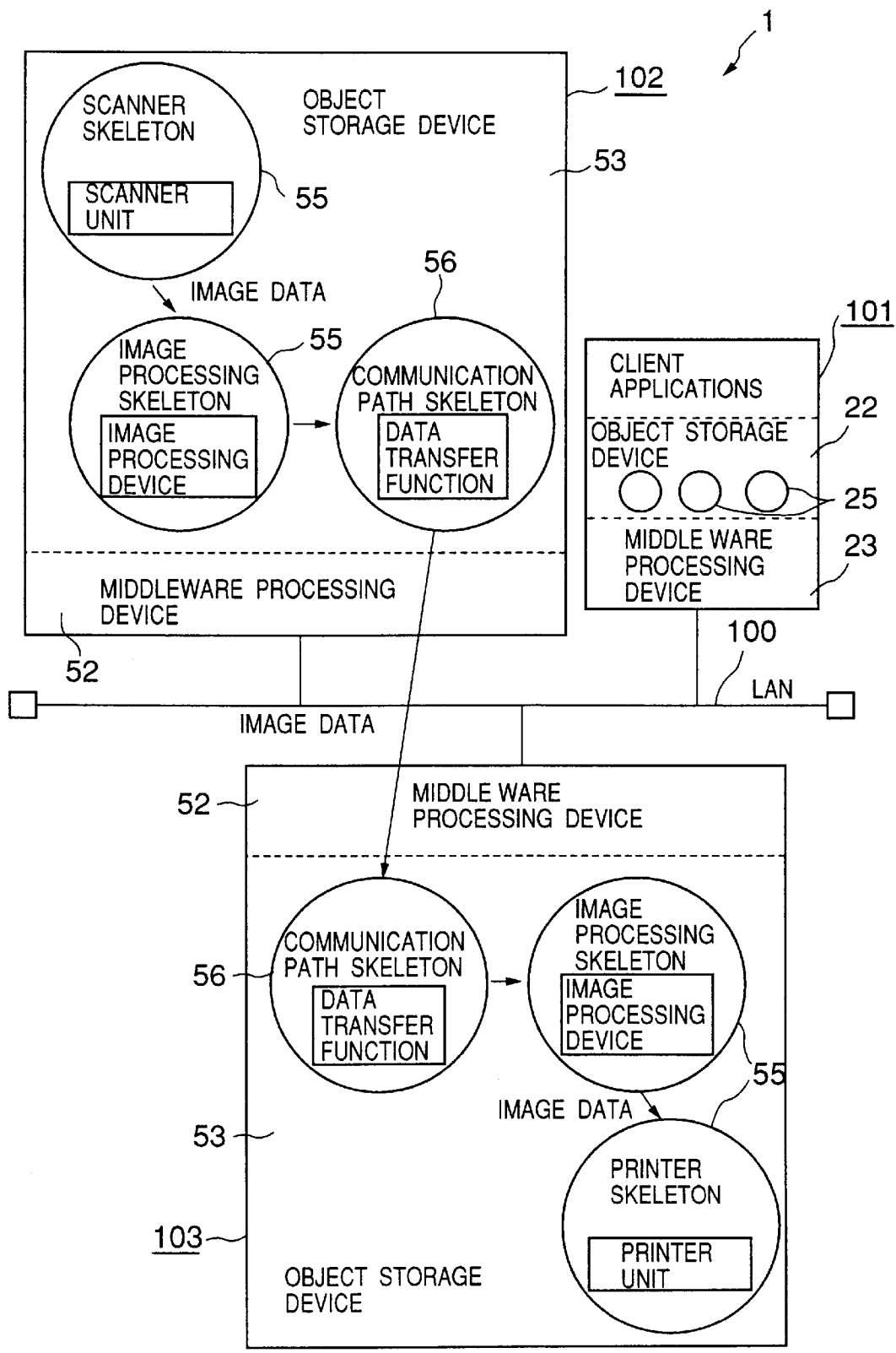
FIG. 8 is a diagram for explaining an image data transmission between image processing objects from one of the servers to another in the client/server system.

FIG. 8 shows an image data transmission from the server 102 to the server 103 in the client/server system 1. In the example of FIG. 8, image data is read out from a document by the scanner unit 40 of the server 102, the image data is transmitted from the server 102 to the server 103 via the communication network 100, and the image data is printed by the printer unit 41 of the server 103.

As shown in FIG. 8, in each of the servers 102 and 103, the binding of the scanner skeleton 55 (or the printer skeleton 55), the image processing skeleton 55 and the communication path skeleton 56 for performing the image data transmission is preset. The image data from the scanner unit 40 of the server 102 is output to the communication path skeleton 56 via the image processing skeleton 55. It is conceivable that the image processing skeleton 55 causes the image data to be converted into Modified Huffman codes for facsimile transmission, for example. To carry out this, each of the servers 102 and 103 has to include the hardware and software needed for performing the image data compression or decompression.

By using the data transfer function of the communication path skeleton 56, the image data is transmitted from the server 102 to the communication network 100 by a method unrelated to the middleware (the ORB). For example, bit-map image data from the server 102 can be transmitted to the communication network 100 by using the data transfer function of the communication path skeleton 56.

The image data from the communication network 100 is received by the communication path skeleton 56 of the server 103 by the method unrelated to the middleware (the ORB). In the server 103, the image data from the communication path skeleton 56 is input to the printer skeleton 55 via the image processing skeleton 55. Therefore, the image data is printed by the printer unit 41 of the server 103.

Further, it is possible for the above-described embodiment of the client/server system 1 to transfer image data between the image processing objects of one of the servers in the client/server system 1.

Figure 9:
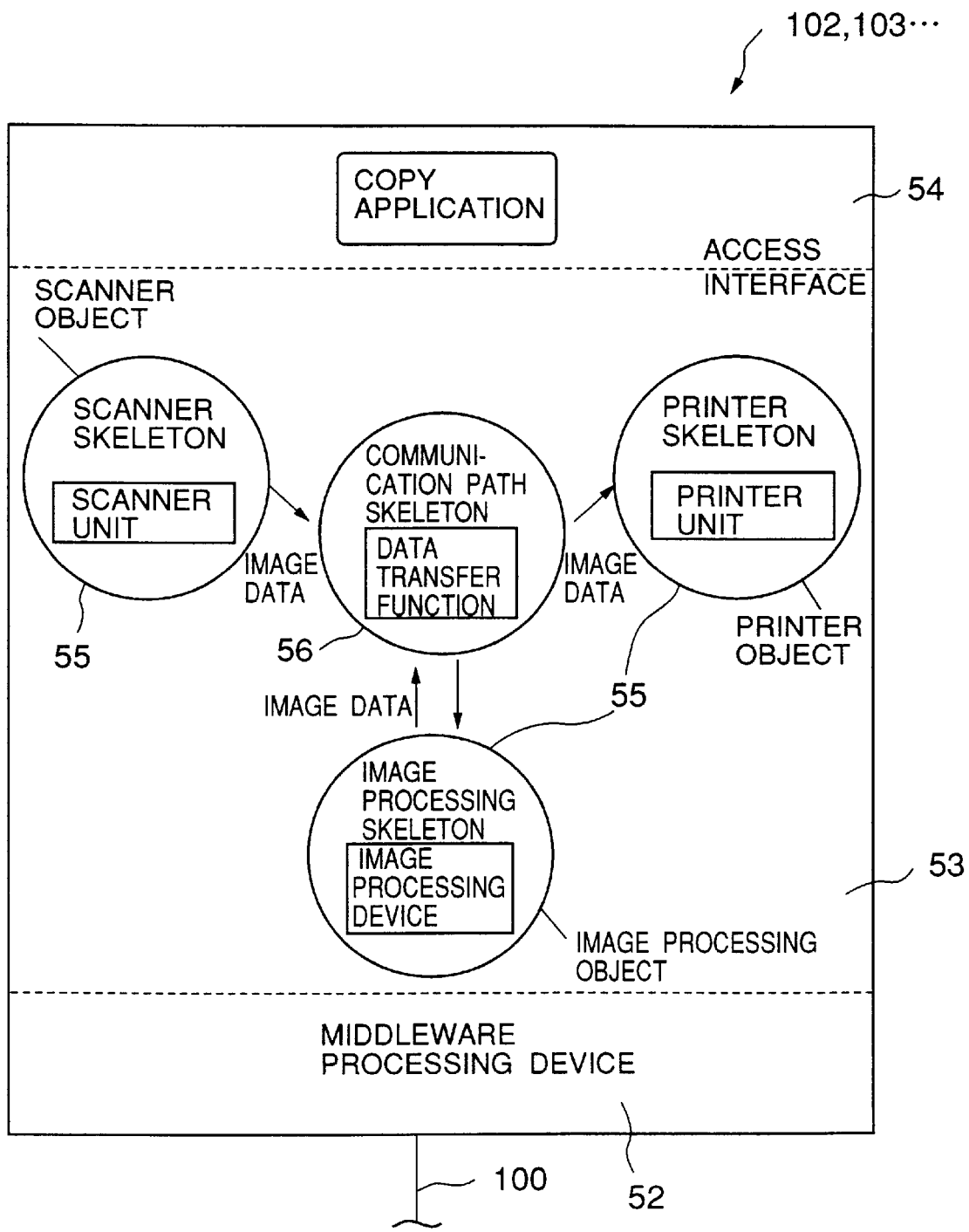
FIG. 9 is a diagram for explaining one example of an image data transfer between the image processing objects of one of the servers in the client/server system.

FIG. 9 shows one example of an image data transfer function between the image processing objects of one of the servers in the client/server system 1.

In the example of FIG. 9, a copy application in the image processing applications 54 is performed. That is, image data is read out from a document by the scanner unit 40 of one (for example, the server 102) of the servers, the image data is transmitted from the scanner skeleton 55 to the printer skeleton 55 via the communication path skeleton 56 in the server, and the image data is printed by the printer unit 41 in the server. In addition, the image processing skeleton 55 may be connected to the communication path skeleton 56, and the image data from the communication path skeleton 56 may be processed by the image processing skeleton 55 by using an image processing function (for example, a color printing function) of the image processing device 42. In this case, the processed image data from the image processing skeleton 55 is transmitted to the printer skeleton 55 via the communication path skeleton 56.

As shown in FIG. 9, in the server (for example, the server 102), the binding of the scanner skeleton 55, the printer skeleton 55, the communication path skeleton 56, and the image processing skeleton 55 for performing the image data transfer function is preset. The image data read by the scanner unit 40 is output to the communication path skeleton 56 in the server 102. The image data from the communication path skeleton 56 is input to the image processing skeleton 55, and it is processed by the image processing device 42 before the image data is printed. The image data from the image processing device 42 is input to the printer skeleton 55 via the communication path skeleton 56, so that the image data is printed by the printer unit 41.

Figure 10:
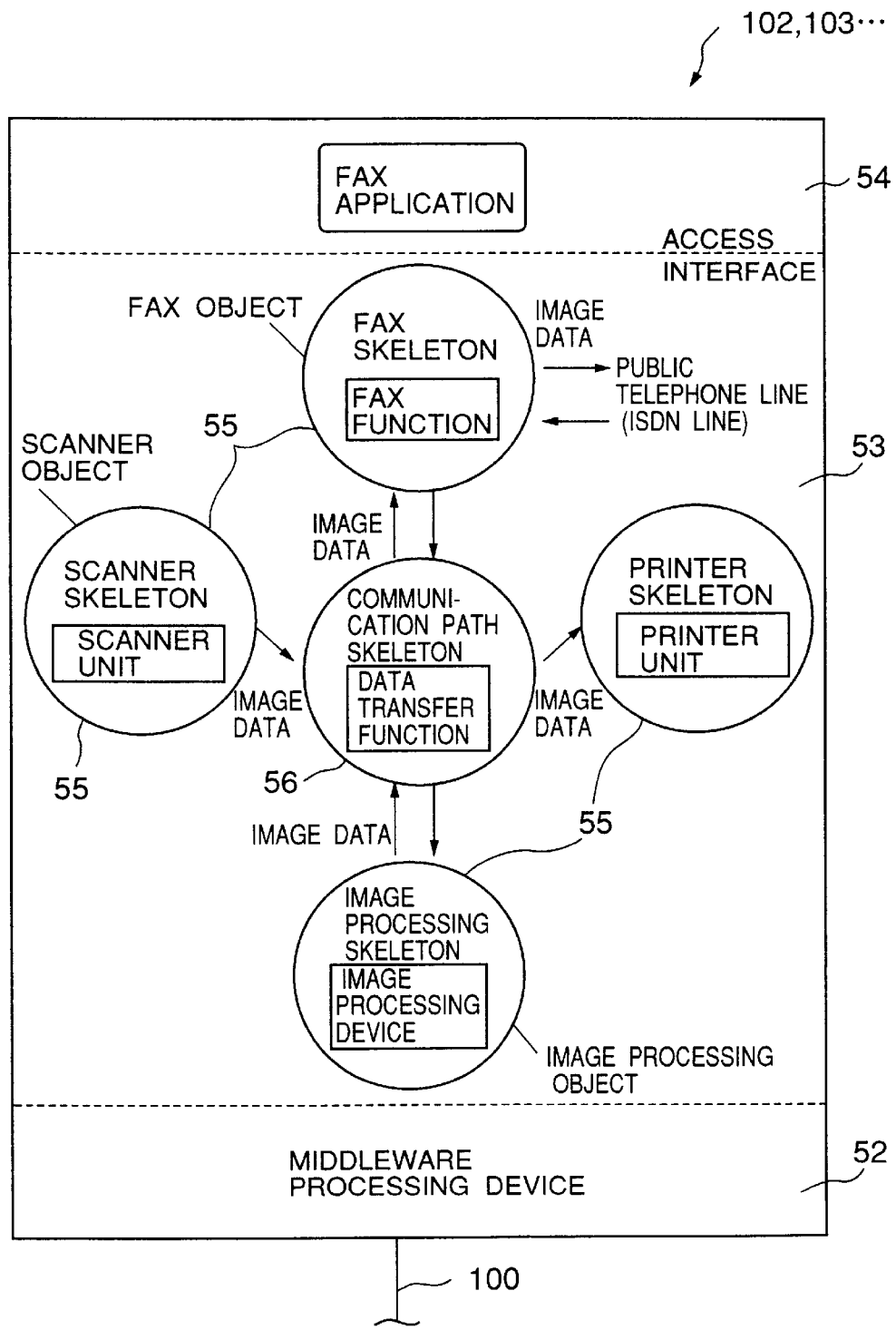
FIG. 10 is a diagram for explaining another example of the image data transfer between the image processing objects of one of the servers in the client/server system.

FIG. 10 shows another example of the image data transfer function between the image processing objects of one of the servers in the client/server system.

In the example of FIG. 10, a fax application in the image processing applications 54 is performed. That is, image data is read out from a document by the scanner unit 40 of one (for example, the server 102) of the servers, and the image data is transmitted from the scanner skeleton 55 to the fax skeleton 55 via the communication path skeleton 56, so that the image data is transmitted from the server 102 to a public telephone line (or an ISDN line) by using a fax transmission function of the modem unit 39. Alternatively, image data from the public telephone line is received by using a fax receiving function of the modem unit 39, and the image data is transmitted from the fax skeleton 55 to the printer skeleton 55 via the communication path skeleton 56, so that the image data is printed by the printer unit 41 in the server 102.

Further, in the example of FIG. 10, the image processing skeleton 55 may be connected to the communication path skeleton 56. For example, the image data from the communication path skeleton 56 may be processed by the image processing skeleton 55 by using an image processing function of the image processing device 42 before the image data is transmitted to the public telephone line or before the image data is printed by the printer unit 41. In this case, the processed image data from the image processing skeleton 55 is transmitted to either the fax skeleton 55 or the printer skeleton 55 via the communication path skeleton 56.

As shown in FIG. 10, in the server (for example, the server 102), the binding of the scanner skeleton 55, the printer skeleton 55, the fax skeleton 55, the communication path skeleton 56, and the image processing skeleton 55 for performing the fax application is preset. During the fax transmission process, the image data read by the scanner unit 40 is output to the communication path skeleton 56 in the server 102. The image data from the communication path skeleton 56 is input to the image processing skeleton 55, and it is processed by the image processing device 42 before the image data is transmitted. The image data from the image processing device 42 is input to the fax skeleton 55 via the communication path skeleton 56, so that the image data is transmitted by the modem unit 39. On the other hand, during the fax receiving process, the image data received by the modem unit 39 is output to the communication path skeleton 56 in the server 102. The image data from the communication path skeleton 56 is input to the image processing skeleton 55, and it is processed by the image processing device 42 before the image data is printed. The image data from the image processing device 42 is input to the printer skeleton 55 via the communication path skeleton 56, so that the image data is printed by the printer unit 41.

In the above-described client/server system 1, the image processing objects for the client 101 and the servers 102, 103, . . . can be prepared using the Interface Definition Language (IDL) regardless of which programming language or which operating system the client/server computers use, and it is not necessary that the application programs of the client and the servers be individually developed for the respective computers in conformity with their operating systems and their data conversion formats. Therefore, the above-described client/server system 1 makes it possible to increase the efficiency of development of the application programs of the client/server system and ensure the implementation thereof at a reduced cost.

In the servers 102, 103, . . . in the above-described embodiment, the image processing objects 55 include parameters specific to the image processing units 39–42 of the servers. The parameters in the image processing objects 55 may be determined or updated by external input data which is input by using the control panel 37 or the I/F 38. Therefore, even when the hardware of the image processing units 39–42 is modified for an upgrade, the parameters in the image processing objects 55 can be easily updated by inputting the external input data suited to the changes. Further, the update of the parameters in the image processing objects 55 may be performed either by inputting the external input data within the servers or by transmitting the external input data from the client 101 across the communication network 100.

In the servers 102, 103, . . . in the above-described embodiment, the image processing objects 55 include common access interfaces for image processing units in the servers when such image processing units provide a substantially identical service and have different specifications. The access interfaces are defined in the Interface Definition Language (IDL) in conformity with the middleware (the ORB) and included in the image processing objects 55, and therefore the access interfaces can be made common to the above image processing units.

In the above-described embodiment, the devices 21–24 of the client 101 and the devices 51–54 of the client 102 are respectively provided by the execution of the program code instructions in the RAM 5 by the CPU 3 and the execution of the program code instructions in the RAM 34 by the CPU 31. However, the present invention is not limited to this embodiment. According to the present invention, it is possible that a part of these devices be provided using purpose-specific hardware and the remaining devices be provided using the software stored in the RAM 5 or the RAM 34.

In the client 101 in the above-described embodiment, the program code instructions from the CD-ROM 9 may be loaded to the HDD 6, and the program code instructions from the HDD 6 are transferred to the RAM 5 and then executed by the CPU 2. However, the present invention is not limited to this embodiment. According to the present invention, it is possible that any storage device, such as for example, magnetic disks (floppy disks), optical disks including DVDs, magneto-optical disks such as MOs, semiconductor memory cards such as PC cards, and other types of computer-readable storage devices and media be used to store the program code instructions therein.

In the client/server system 1 in the above-described embodiment, the program code instructions needed for the client 101 and the servers 102, 103, . . . are stored in the RAM 5 and in the RAM 34. The present invention can be easily applied to the existing client/server system by installing the program code instructions in the client and the servers of the existing client/server system. Further, the installation of the program code instructions in the existing client/server system may be performed by transmitting a packaged software of the program code instructions to the existing client/server system via a communication network.

Figure 11:
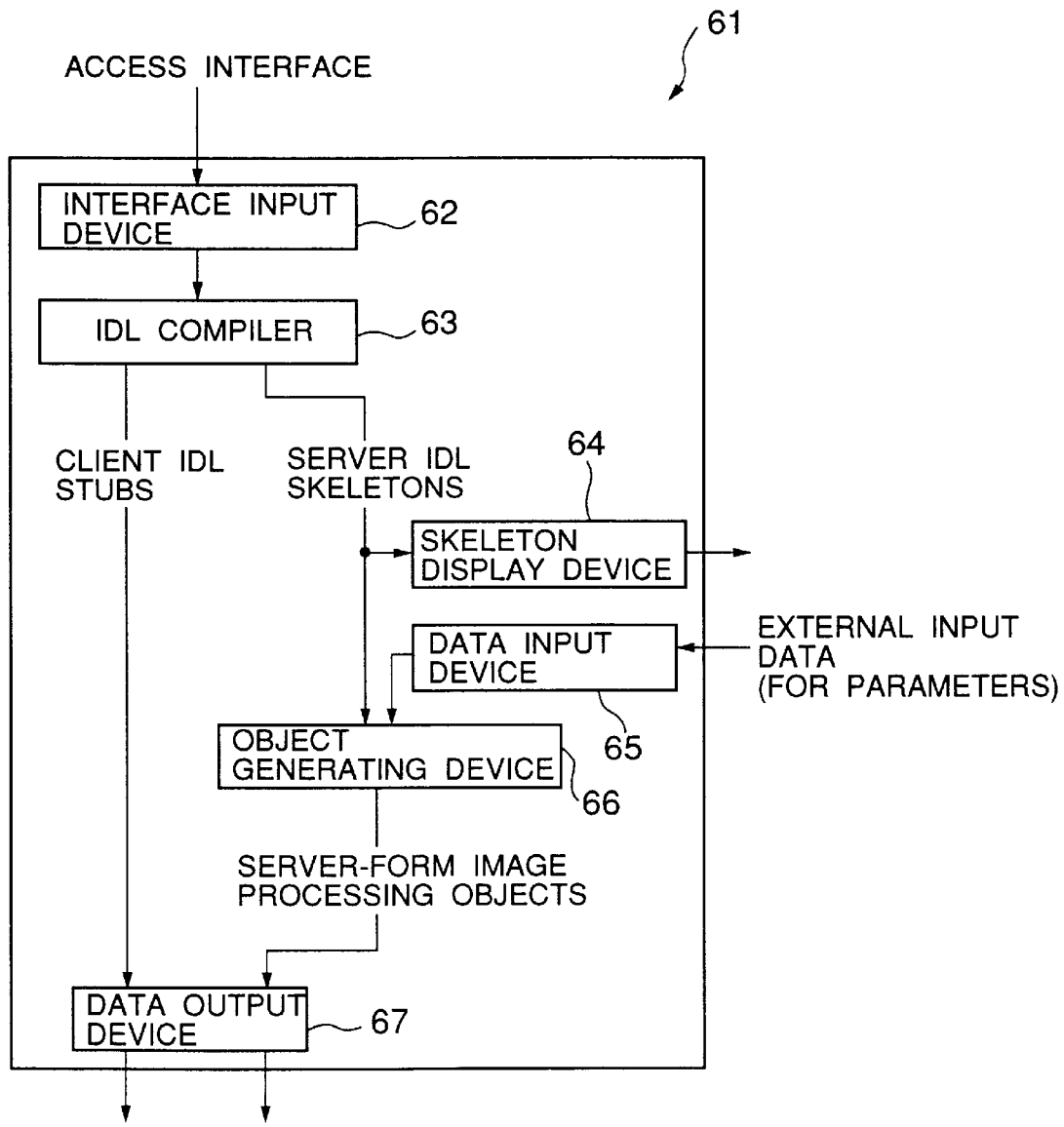
FIG. 11 is a diagram for explaining a program generating system which generates image processing objects of the client and image processing objects of the server.
Figure 12:
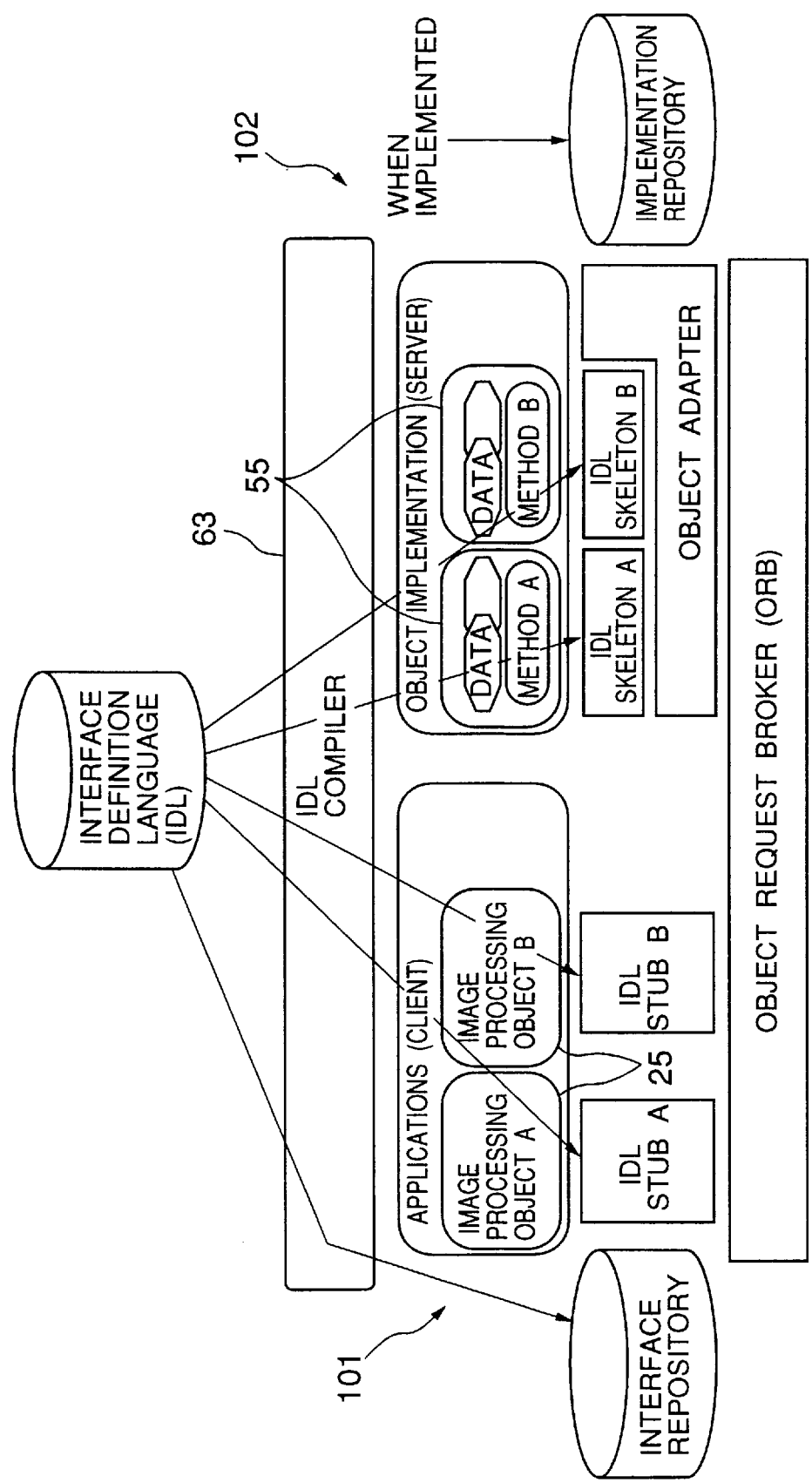
FIG. 12 is a diagram for explaining a relationship between the image processing objects of the client, the image processing objects of the server, and the object-oriented middleware.

Next, FIG. 11 shows a program generating system 61 which generates the image processing objects 25 in the client 101 and the image processing objects 55 in the server 102. FIG. 12 shows a relationship between the image processing objects 25 of the client 101, the image processing objects 55 of the server 102, and the object-oriented middleware (the ORB).

The program generating system 61 in this embodiment has the same hardware as the client 101 shown in FIG. 3. The elements of the program generating system 61 which are the same as corresponding elements of the client 101 are designated by the same reference numerals, and a duplicate description thereof will be omitted.

As shown in FIG. 11, the program generating system 61 includes an interface input device 62, an IDL compiler 63, a skeleton display device 64, a data input device 65, an object generating device 66, and a data output device 67. These devices are the software (program code instructions) of the client 101 which is stored in the RAM 5, and the functions of these devices are provided by the execution of the program code instructions by the CPU 2.

By the execution of the program code instructions by the CPU 2, the interface input device 62 receives access interfaces which are manually input by using the keyboard 12 or other input devices. The access interfaces are defined in the Interface Definition Language (IDL) in conformity with the middleware (the ORB). The access interfaces are prepared with respect to the image processing applications 54 of the server 102 so that specific interfaces to the image processing units 39–42 of the server 102 are included in the image processing objects 55.

By the execution of the program code instructions by the CPU 2, the IDL compiler 63 generates the client IDL stubs or the server IDL skeletons from the access interfaces from the interface input device 62. The compiled stubs result in the image processing objects 25 in the client 101. The compiled skeletons result in the image processing objects 55 in the server 102. The IDL compiler 63 in the present embodiment is the known IDL compiler provided in conformity with the CORBA.

By the execution of the program code instructions by the CPU 2, the skeleton display device 64 displays the compiled skeletons on the display 13. When the compiled skeletons are displayed on the display 13, the user at the client 101 manually inputs an external input data input by using the keyboard 12. By the execution of the program code instructions by the CPU 2, the data input device 65 receives the external input data in order to create the parameters of the server IDL skeletons in the image processing objects 55.

By the execution of the program code instructions by the CPU 2, the object generating device 66 generates the image processing objects 55 by incorporating the external input data from the data input device 65 into the compiled skeletons from the IDL compiler 63. The data output device 67 outputs the image processing objects 25 or the image processing objects 55 by using the FDD 8 or the I/F 14. Therefore, the image processing objects 25 in the client 101 include the client IDL stubs, and the image processing objects 55 in the server 102 include the server IDL skeletons and the parameters specific to a corresponding one of the image processing units 39–42. The parameters of the server IDL skeletons are determined by the external input data.

As described above, the program code instructions within the client 101 include: a portion which causes the program generating system 61 to receive the access interfaces which are manually input by using the keyboard 12 or other input devices; a portion which causes the program generating system 61 to generate the client IDL stubs or the server IDL skeletons from the access interfaces; a portion which causes the program generating system 61 to display the compiled skeletons on the display 13; a portion which causes the program generating system 61 to receive the external input data which is manually input by using the keyboard 12 or the like; a portion which causes the program generating system 61 to generate the image processing objects 55 by incorporating the external input data into the compiled skeletons; and a portion which causes the program generating system 61 to output the image processing objects 25 or the image processing objects 55 by using the FDD 8 or the I/F 14.

Accordingly, the program generating system 61 in the present embodiment generates the client-form image processing objects 25 in the client 101 and the server-form image processing objects 55 in the server 102. The image processing objects 55 include the specific interfaces to the image processing units 39–42 in the server 102.

In the case of the above-described program generating system 61, the user prepares the access interfaces with respect to the image processing applications 54 of the server 102 by defining them in the IDL, and inputs the access interfaces by using the keyboard 12 or the like. As shown in FIG. 12, the IDL compiler 63 generates the client IDL stubs or the server IDL skeletons from the access interfaces which have been input by the user. For example, IDL stubs "A" and "B" are generated by the IDL compiler 63 for the image processing objects "A" and "B" in the client 101, or IDL skeletons "A" and "B" are generated by the IDL compiler 63 for the image processing objects "A" and "B".

In the program generating system 61, the compiled skeletons from the IDL compiler 63 are displayed on the display 13. When the compiled skeletons are displayed on the display 13, the user inputs an external input data input by using the keyboard 12. The program generating system 61 receives the external input data when it is input by the user. The program generating system 61 generates the image processing objects 55 by incorporating the external input data into the compiled skeletons.

Further, the program generating system 61 outputs the image processing objects 25 or the image processing objects 55 by using the FDD 8 or the I/F 14. The image processing objects 25 and the image processing objects 55 are output to, for example, the floppy disk 7 by using the FDD 8. By using the floppy disk 7, the image processing objects 25 may be installed in the client 101, and the image processing objects 55 may be installed in the server 102.

As in the above-described embodiment, the program generating system 61 may generate the server-form image processing objects 55 for the other servers 103, . . . in the client/server system 1. The image processing objects 55 may include the specific interfaces to the image processing units in the other servers 103, . . . Further, as described above, the image processing objects 55 of the servers 102, 103, . . . may include common interfaces for image processing units in the servers when such image processing units provide a substantially same service and have different specifications.

In the above-described embodiment, it is assumed to provide the program generating system 61 which is separated from the client/server system 1. However, the program generating system 61 may be connected to the client/server system 1 via the communication network 100. Alternatively, the program generating system 61 may be formed integrally with the client 101.

Further, the present invention is not limited to the above-described embodiments, and variations and modifications may be made without departing from the scope of the present invention.

What is claimed is:

1. A client/server system including a client and a plurality of servers connected via a communication network, said client/server system comprising:

the client including:
an object-oriented middleware;
an object storage device having a plurality of client-form image processing objects;
a request input device for receiving a client-form request input by a user at the client, said client-form request indicating a selected one of the image processing objects of said object storage device;
a middleware processing device for converting the client-form request from said request input device into a standard-form request readable by the middleware; and
a request transmitting device for transmitting the standard-form request from said middleware processing device to the communication network, and
the plurality of servers, each of the plurality of servers including:
an object-oriented middleware;
a plurality of image processing units;
an object storage device having a plurality of image processing objects, the image processing objects having specific interfaces to the image processing units, any one of the image processing objects allowing a corresponding one of the image processing units to be executed in response to a server-form request;
a request receiving device for receiving a standard-form request from the communication network, said standard-form request indicating a selected one of the image processing objects in the object storage device of the server; and
a middleware processing device for converting the standard-form request from said request receiving device into a server-form request, and for transmitting the server-form request to the selected one of the image processing objects so that a corresponding one of the image processing units is executed in response to the server-form request.

2. The client/server system according to claim 1, wherein the image processing objects of the plurality of servers include common interfaces for image processing units in the plurality of servers when said image processing units provide a substantially identical service and have different specifications.

3. The client/server system according to claim 1, wherein the interfaces of the image processing objects of each of the plurality of servers are defined in an interface definition language in conformity with the middleware.

4. The client/server system according to claim 1, wherein the image processing objects of each of the plurality of servers include parameters specific to a corresponding one of the image processing units, said parameters being determined by an external input data.

5. The client/server system according to claim 1, wherein said plurality of servers include a first server which outputs image data from one of the image processing units provided therein, said first server comprising an image data output device for transmitting said image data from said one of the image processing units to the communication network, the object storage device of the first server including a communication path object, said communication path object allowing the image data output device to transmit the image data to the communication network by a method unrelated to the middleware, and wherein said plurality of servers include a second server which inputs image data to one of the image processing units provided therein, said second server comprising an image data input device for receiving said image data from the communication network, the object storage device of the second server including a communication path object, said communication path object allowing the image data input device to receive the image data from the communication network by a method unrelated to the middleware.

6. The client/server system according to claim 1, wherein said plurality of servers include at least one server which outputs image data from one of the image processing units provided therein and inputs the image data to another image processing unit, the object storage device of said at least one server including a communication path object, said communication path object allowing said one of the image processing units to transfer the image data to said other image processing unit.

7. An image processing method for a client-server system including a client and a plurality of servers connected via a communication network, said data processing method comprising the steps of:

providing an object-oriented middleware for the client;

providing a plurality of client-form image processing objects for the client;

receiving a client-form request input by a user at the client, said client-form request indicating a selected one of the image processing objects;

converting the client-form request into a standard-form request readable by the middleware;

transmitting the standard-form request to the communication network;

providing an object-oriented middleware for each of the plurality of servers;

providing a plurality of image processing units for each of the plurality of servers;

providing a plurality of image processing objects for each of the plurality of servers, the image processing objects having specific interfaces to the image processing units, any one of the image processing objects allowing a corresponding one of the image processing units to be executed in response to a server-form request;

receiving the standard-form request from the communication network, said standard-form request indicating a selected one of the image processing objects in one of the plurality of servers;

converting the standard-form request into a server-form request; and transmitting the server-form request to the selected one of the image processing objects so that a corresponding one of the image processing units is executed in response to the server-form request.

8. The image processing method according to claim 7, further comprising the steps of:

outputting image data from one of the image processing units provided in a first server of the plurality of servers;

transmitting said image data from said one of the image processing units to the communication network by a method unrelated to the middleware;

receiving said image data from the communication network in a second server of the plurality of servers by a method unrelated to the middleware; and inputting said image data to one of the image processing units provided in said second server.

9. The image processing method according to claim 7, further comprising the steps of:

outputting image data from one of the image processing units of one of the plurality of servers to a communication path object provided therein; and inputting the image data from the communication path object to another image processing unit of said one of the plurality of servers.

10. A server connected to a client via a communication network for use in a client/server system, said server comprising:

an object-oriented middleware;

a plurality of image processing units;

an object storage device having a plurality of image processing objects, the image processing objects having specific interfaces to the image processing units, any one of the image processing objects allowing a corresponding one of the image processing units to be executed in response to a server-form request;

a request receiving device for receiving a standard-form request from the communication network, said standard-form request indicating a selected one of the image processing objects in the object storage device of the server;

a middleware processing device for converting the standard-form request from said request receiving device into a server-form request, and for transmitting the server-form request to the selected one of the image processing objects so that a corresponding one of the image processing units is executed in response to the server-form request.

11. The server according to claim 10, wherein the image processing objects of the server include common interfaces for image processing units in the server when said image processing units provide a substantially identical service and have different specifications.

12. A client connected to a plurality of servers via a communication network for use in a client/server system, said client comprising:

an object-oriented middleware;

an object storage device having a plurality of client-form image processing objects;

a request input device for receiving a client-form request input by a user at the client, said client-form request indicating a selected one of the image processing objects of said object storage device;

a middleware processing device for converting the client-form request from said request input device into a standard-form request readable by the middleware; and a request transmitting device for transmitting the standard-form request from said middleware processing device to the communication network.

13. A computer program product for use with a client in a client/server system wherein the client comprises a plurality of image processing objects and an object-oriented middleware, said computer program product comprising:

a computer readable storage medium and a program code mechanism embedded in the computer readable storage medium, said program code mechanism comprising:

first program code means for causing the client to receive a client-form request, said client-form request indicating a selected one of the image processing objects of the client;

second program code means for causing the client to convert the client-form request from said first program code means into a standard-form request readable by the middleware; and third program code means for causing the client to transmit the standard-form request from said second program code means to a communication network.

14. A computer program product for use with a server in a client/server system wherein the server comprises a plurality of image processing objects, an object-oriented middleware and a plurality of image processing units, the image processing objects having specific interfaces to the image processing units, any one of the image processing objects allowing a corresponding one of the image processing units to be executed in response to a server-form request, said computer program product comprising:

a computer readable storage medium and a program code mechanism embedded in the computer readable storage medium, said program code mechanism comprising:

first program code means for causing the server to receive a standard-form request from a communication network, said standard-form request indicating a selected one of the image processing objects of the server;

second program code means for causing the server to convert the standard-form request from said first program code means into a server-form request; and third program code means for causing the server to transmit the server-form request from said second program code means to the selected one of the image processing objects so that a corresponding one of the image processing units is executed in response to the server-form request.

* * * * *